(12) United States Patent
Takahashi et al.

(10) Patent No.: US 10,676,089 B2
(45) Date of Patent: Jun. 9, 2020

(54) DRIVING ASSISTANCE DEVICE

(71) Applicant: ISUZU MOTORS LIMITED, Tokyo (JP)

(72) Inventors: Naoki Takahashi, Yokohama (JP); Kazutaka Shimoda, Kawasaki (JP); Masaichi Takahashi, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 16/093,665

(22) PCT Filed: Apr. 11, 2017

(86) PCT No.: PCT/JP2017/014812
§ 371 (c)(1),
(2) Date: Oct. 15, 2018

(87) PCT Pub. No.: WO2017/179570
PCT Pub. Date: Oct. 19, 2017

(65) Prior Publication Data
US 2019/0071083 A1    Mar. 7, 2019

(30) Foreign Application Priority Data
Apr. 15, 2016  (JP) ................................ 2016-082142

(51) Int. Cl.
*B60W 30/16*    (2020.01)
*B60W 30/09*    (2012.01)
(Continued)

(52) U.S. Cl.
CPC ............. *B60W 30/162* (2013.01); *B60T 7/22* (2013.01); *B60W 10/04* (2013.01); *B60W 10/18* (2013.01);
(Continued)

(58) Field of Classification Search
CPC ...... B60T 2201/02; B60T 7/22; B60W 10/04; B60W 10/18; B60W 2550/302;
(Continued)

(56) References Cited

U.S. PATENT DOCUMENTS 5,710,565 A * 1/1998 Shirai ................ B60K 31/0008
340/903
6,044,321 A * 3/2000 Nakamura ......... B60K 31/0008
180/179
(Continued)

FOREIGN PATENT DOCUMENTS

EP    2902291 A1    8/2015
JP    60-091500 A    5/1985
(Continued)

OTHER PUBLICATIONS

International Search Report from International Application No. PCT/JP2017/014812 dated Jul. 11, 2017.
(Continued)

*Primary Examiner* — Tyler J Lee
(74) *Attorney, Agent, or Firm* — Brundidge & Stanger, P.C.

(57) ABSTRACT

A driving assistance device (30) that has: an information acquisition unit (31) that acquires the relative speed of a vehicle ahead and the inter-vehicle distance to the vehicle ahead; a table (33) in which degrees of urgency that correspond to relative speeds and inter-vehicle distances have been pre-stored; and an ACC control unit (32) that reads out, from the table (33), a degree of urgency (x) that corresponds to the relative speed and inter-vehicle distance acquired by the information acquisition unit (31), finds a target acceleration/deceleration that has a slope (y) that is based on the
(Continued)

degree of urgency (x) that was read out, and outputs the found target acceleration/deceleration as a control signal for controlling break pressure.

2 Claims, 4 Drawing Sheets

(51) Int. Cl.
*B60W 10/18* (2012.01)
*B60W 10/04* (2006.01)
*B60T 7/22* (2006.01)
*B60W 30/14* (2006.01)
*B60W 30/085* (2012.01)

(52) U.S. Cl.
CPC .......... *B60W 30/085* (2013.01); *B60W 30/09* (2013.01); *B60W 30/143* (2013.01); *B60W 30/16* (2013.01); *B60T 2201/02* (2013.01); *B60W 2550/302* (2013.01); *B60W 2550/308* (2013.01); *B60W 2710/182* (2013.01); *B60W 2720/106* (2013.01)

(58) Field of Classification Search
CPC ..... B60W 2550/308; B60W 2710/182; B60W 2720/106; B60W 30/085; B60W 30/09; B60W 30/143; B60W 30/16; B60W 30/162
See application file for complete search history.

(56) References Cited

U.S. PATENT DOCUMENTS

| | | | |
|---|---|---|---|
| 8,321,116 B2* | 11/2012 | Lingman | B60T 7/22 701/96 |
| 2002/0091478 A1 | 7/2002 | Tamura et al. | |
| 2003/0028311 A1* | 2/2003 | Seto | B60K 31/0008 701/96 |
| 2003/0158648 A1* | 8/2003 | Kubota | B60K 31/0008 701/96 |
| 2004/0102889 A1* | 5/2004 | Ibrahim | B60K 31/0008 701/96 |
| 2004/0119333 A1* | 6/2004 | Hackl | B60K 31/0008 303/125 |
| 2004/0193353 A1* | 9/2004 | Dunoyer | B60K 31/0008 701/96 |
| 2009/0203498 A1* | 8/2009 | Lingman | B60T 7/22 477/183 |
| 2011/0125372 A1 | 5/2011 | Ito | |
| 2015/0210280 A1 | 7/2015 | Agnew | |

FOREIGN PATENT DOCUMENTS

| | | |
|---|---|---|
| JP | 07-017295 A | 1/1995 |
| JP | 07-065297 A | 3/1995 |
| JP | 2000-108866 A | 4/2000 |
| JP | 2002-274347 A | 9/2002 |
| JP | 2006-175941 A | 7/2006 |
| JP | 2007-145314 A | 6/2007 |
| WO | 2016/050253 A1 | 4/2016 |

OTHER PUBLICATIONS

Extended European Search Report from EP Application No. 17782383.8 dated Mar. 25, 2019.

* cited by examiner

DRIVING ASSISTANCE DEVICE

TECHNICAL FIELD

The present disclosure relates to a driving assistance apparatus for assisting in driving a vehicle.

BACKGROUND ART

In recent years, Adaptive Cruise Control (hereinafter referred to as "ACC") has attracted attention as one of techniques for assisting in driving a vehicle (see, for example, PTL 1). ACC is a technique for acquiring the speed of the host vehicle, the speed of the preceding vehicle relative to that of the host vehicle, the distance between the host vehicle and the preceding vehicle, and the like to control the driving system and braking system of the host vehicle so that the vehicle speed and the following distance to the preceding vehicle are kept constant. For instance, when the speed of the host vehicle is high or the following distance is small, ACC actuates a brake to decelerate the host vehicle.

Such a technique can be used for a vehicle, such as a so-called tractor head, to which a trailer can be connected to reduce the burden on the driver operating such a vehicle and improve the comfort of running.

CITATION LIST

Patent Literature

PTL 1
Japanese Patent Application Laid-Open No. HEI7-17295

SUMMARY OF INVENTION

Technical Problem

By the way, during brake control in ACC, an ACC control section sets a target acceleration/deceleration and outputs the target acceleration/deceleration to an engine brake system, an auxiliary brake system, and a main brake system. In general, the engine brake system performs braking when the target acceleration/deceleration reaches less than or equal to a first threshold, the auxiliary brake performs braking when the target acceleration/deceleration reaches less than or equal to a second threshold (the second threshold<the first threshold), and the main brake performs braking when the target acceleration/deceleration reaches less than or equal to a third threshold (the third threshold<the second threshold). In this manner, stepwise brake control is performed according to the target acceleration/deceleration. Incidentally, an auxiliary brake is an exhaust brake or retarder brake, and a main brake is a disk brake or drum brake.

Here, the main brake, which operates in a situation where the required deceleration is high (that is, in a situation where the target deceleration is high), has a significant impact on the feeling of the people in the vehicle, such as the driver. For this reason, delicate control is required which causes no discomfort to the people in the vehicle while attaining a target deceleration. However, delicate control, which requires a large number of computations and a large-scale circuit, is disadvantageous in that it complicates the entire configuration.

An object of the present disclosure is to provide a driving assistance apparatus that can perform delicate main brake control as needed while ensuring safety with a simple configuration.

Solution to Problem

An aspect of a driving assistance apparatus of the present disclosure is a driving assistance apparatus that assists in driving a vehicle, the driving assistance apparatus including:
an information acquisition section that acquires a speed of a preceding vehicle relative to the vehicle, and a following distance between the vehicle and the preceding vehicle;
a table that prestores a degree of urgency corresponding to the relative speed and the following distance; and
a control section that reads, from the table, the degree of urgency corresponding to the relative speed and the following distance acquired by the information acquisition section, determines a target acceleration/deceleration having a gradient based on the read degree of urgency, and outputs the determined target acceleration/deceleration as a control signal for controlling brake pressure.

Advantageous Effects of Invention

The present disclosure provides a driving assistance apparatus that can perform delicate main brake control as needed while ensuring safety with a simple configuration, by acquisition of a degree of urgency through table lookup and determination of a gradient y related to the target acceleration/deceleration by use of the degree of urgency.

DESCRIPTION OF EMBODIMENTS

One embodiment of the present disclosure will now be described in detail below with reference to the accompanying drawings.

<Configuration of Vehicle>

First, a configuration of a vehicle including a driving support apparatus according to an embodiment of the present disclosure will be described.

Figure 1:
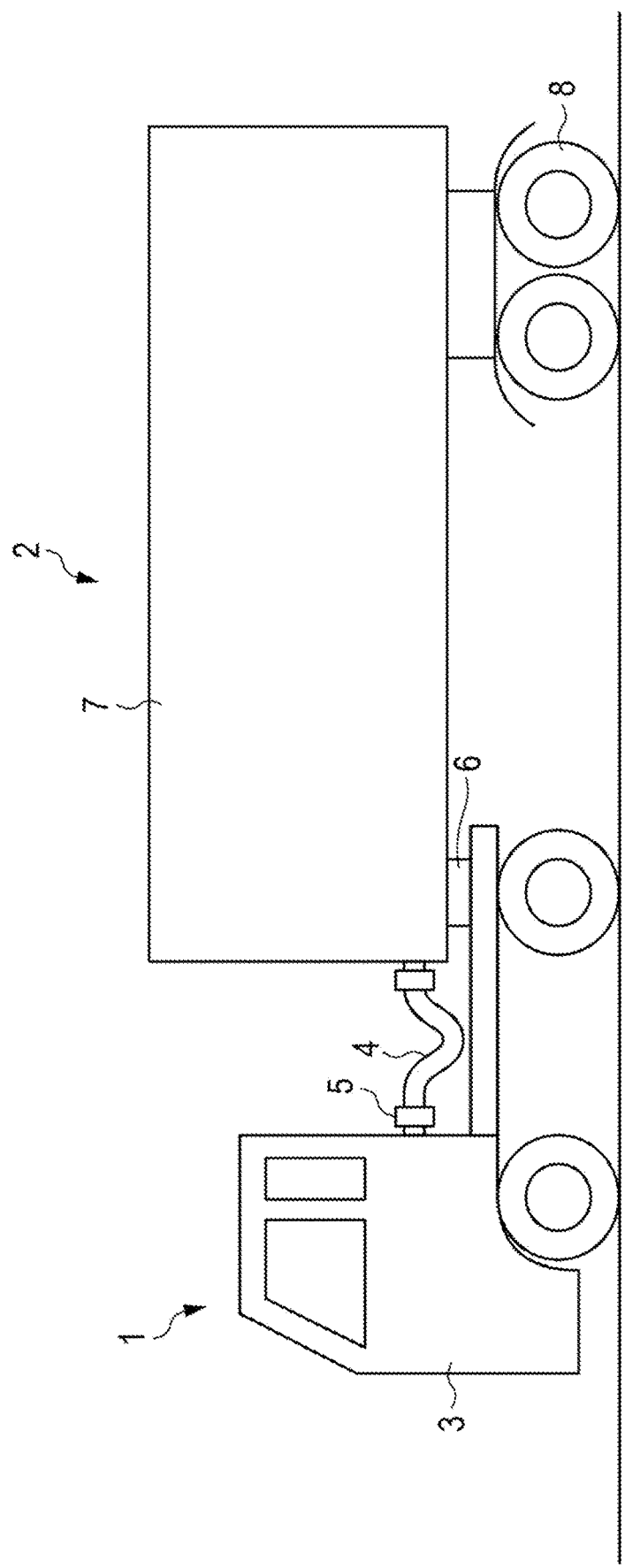
FIG. 1 is an external view showing an example of the use state of a vehicle according to one embodiment.
Figure 2:
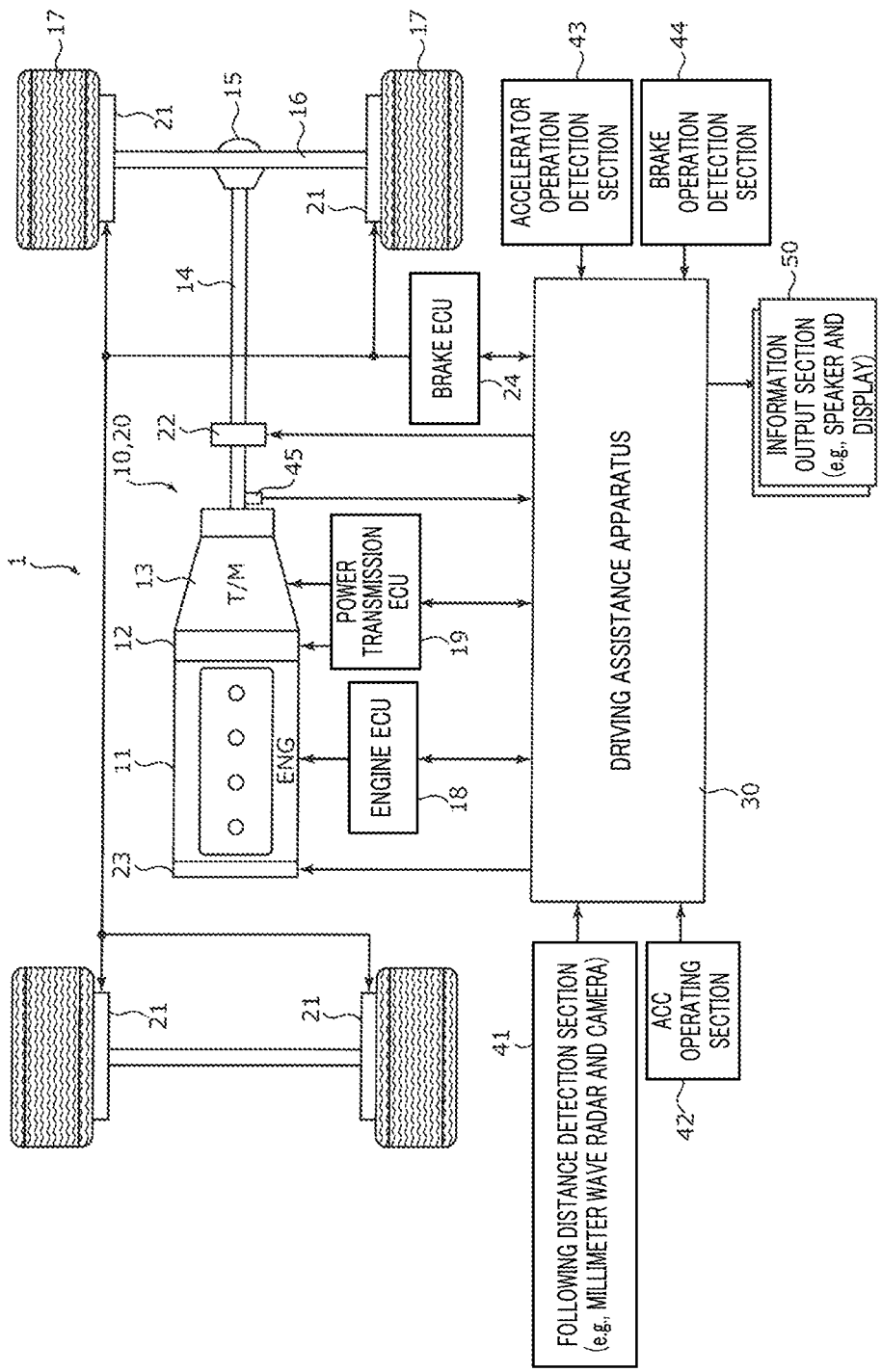
FIG. 2 is a block diagram showing an example of the configuration of the vehicle according to the embodiment.

FIG. 1 is an external view showing an example of the use state of a vehicle including a driving assistance apparatus according to this embodiment. FIG. 2 is a block diagram showing an example of the configuration of the vehicle. Here, illustration and explanation will be given focusing on the part related to the driving assistance apparatus.

As shown in FIG. 1, vehicle 1 is a tractor head (towing vehicle) that can be connected to trailer 2 and trail it.

The vehicle 1 is provided with, for example, a series-connected six-cylinder diesel engine. The vehicle 1 includes vehicle body 3 including a power system, such as an engine and a driving wheel, and a driver's seat; hose 4 and cock 5 for supplying air for brake actuation to trailer 2; and coupler lock switch 6 disposed at the joint to trailer 2. Coupler lock switch 6 is an apparatus for detecting whether or not trailer 2 is connected to vehicle 1. The trailer 2 includes loading section 7 for loading a load and trailer wheels 8 for supporting loading section 7.

As shown in FIG. 2, vehicle 1 includes components such as driving system 10 that runs vehicle 1, braking system 20 that decelerates vehicle 1, and driving assistance apparatus 30 that assists the driver in driving vehicle 1.

Driving system 10 includes engine 11, clutch 12, transmission 13, propeller shaft 14, differential apparatus (differential gear) 15, drive shaft 16, wheels 17, engine ECU 18, and power transmission ECU 19.

Engine ECU 18 and power transmission ECU 19 are connected to driving assistance apparatus 30 via an in-vehicle network, such as a Controller Area Network (CAN), and can transmit and receive necessary data and control signals to/from each other. Engine ECU 18 controls the output of engine 11 according to a drive command from driving assistance apparatus 30. Power transmission ECU 19 controls the engagement and disengagement of clutch 12 and the speed change of transmission 13 according to a drive command from driving assistance apparatus 30.

The power of engine 11 is transmitted to transmission 13 via clutch 12. The power transmitted to transmission 13 is further transmitted to wheels 17 via propeller shaft 14, differential apparatus 15, and drive shaft 16. Thus, the power of engine 11 is transmitted to wheels 17, thereby running vehicle 1.

Braking system 20 includes service brake 21, auxiliary brakes 22 and 23, a parking brake (not shown in the drawing), and brake ECU 24.

Service brake 21 is generally a brake called a main brake, a friction brake, a foot brake, a foundation brake, or the like. Service brake 21 is, for example, a drum brake which obtains a braking force by pressing the brake lining against the inner surface of a drum rotating with wheels 17.

Auxiliary brake 22 is a retarder (hereinafter referred to as "retarder 22") that obtains a braking force by directly applying a load to the rotation of propeller shaft 14, and is, for example, an electromagnetic retarder. Auxiliary brake 23 is an exhaust brake (hereinafter referred to as "exhaust brake 23") that increases the effect of engine braking by using the rotational resistance of the engine. Providing retarder 22 and exhaust brake 23 increases the braking force and reduces the frequency of use of service brake 21, thereby suppressing wear and tear of the brake lining and the like.

Brake ECU 24 is connected to driving assistance apparatus 30 via an in-vehicle network, such as a CAN, and can transmit and receive necessary data and control signals to/from each other. Brake ECU 24 controls the braking force of service brake 21 (the brake fluid pressure in the wheel cylinders of wheels 17) according to a braking command from driving assistance apparatus 30.

Braking operation of service brake 21 is controlled by driving assistance apparatus 30 and brake ECU 24. Braking operation of retarder 22 and exhaust brake 23 is controlled, i.e., turned on/off by driving assistance apparatus 30. Since the braking forces of retarder 22 and exhaust brake 23 are substantially fixed, service brake 21, which can finely adjust the braking force, is suitable for accurately generating a desired braking force.

Although not shown in the drawing, the braking system also includes a service brake provided to trailer wheels 8 of trailer 2. In other words, brake ECU 24 supplies air via hose 4 described above and thus gives trailer wheels 8 of trailer 2 a braking force caused by the frictional force.

Driving assistance apparatus 30 acquires various information from following distance detection section 41, ACC operating section 42, accelerator operation detection section 43, brake operation detection section 44, and vehicle speed sensor 45, and controls the operations of driving system 10 and braking system 20 according to the acquired information.

In addition, driving assistance apparatus 30 outputs various information on running from the information output section 50.

In addition, driving assistance apparatus 30 achieves adaptive cruise control (ACC). In other words, driving assistance apparatus 30 performs constant speed running control and following running control (hereinafter collectively referred to as "automatic running control") in vehicle 1.

During the constant speed running control, driving system 10 and braking system 20 are operated so that, if there is no preceding vehicle within a predetermined range, the running speed of vehicle 1 (hereinafter referred to as "vehicle speed") approaches a predetermined target value (a value or a value range).

During the following running control, driving system 10 and braking system 20 are operated so that, if there is a preceding vehicle in the predetermined rang, the following distance falls within the predetermined target range and the relative speed approaches zero. The details of driving assistance apparatus 30 will be described later.

Following distance detection section 41 measures (detects) the following distance between vehicle 1 and the preceding vehicle (hereinafter simply referred to as "following distance") and outputs the measurement results to driving assistance apparatus 30. For following distance detection section 41, a laser radar, a millimeter wave radar, an imaging apparatus, and the like can be used alone or in combination. The above-described driving assistance apparatus 30 controls the operation of driving system 10 and braking system 20 during constant-speed running and following running, according to the detection results from following distance detection section 41.

ACC operating section 42 includes a main switch for enabling ACC and an ACC setting switch for setting/canceling ACC. ACC operating section 42 further includes a speed setting button for setting the target value of vehicle speed, and a following distance setting button for setting the following distance. Note that these switches and buttons may be user interfaces displayed on a display with a touch panel. ACC operating section 42 outputs an operation signal indicating the details of the operation performed in ACC operating section 42 to driving assistance apparatus 30. The above-described driving assistance apparatus 30 sets information on the automatic running control, according to an operation signal from ACC operating section 42 (the driver's operation through ACC operating section 42).

Accelerator operation detection section 43 detects whether or not the accelerator pedal for accelerating the vehicle is depressed and detects the amount of depression of the accelerator pedal and outputs the detection results to driving assistance apparatus 30. Driving assistance apparatus 30 issues drive commands based on the amount of depression of the accelerator pedal to engine ECU 18 and power transmission ECU 19.

Brake operation detection section 44 detects whether or not the brake pedal for operating service brake 21 is depressed and detects the amount of depression of the brake pedal. Further, brake operation detection section 44 detects whether or not the auxiliary brake lever for operating retarder 22 or exhaust brake 23 is operated. Brake operation detection section 44 outputs the detection results related to the brake pedal and the auxiliary brake lever to driving assistance apparatus 30. The above-described driving assistance apparatus 30 issues a braking command to brake ECU 24 based on the amount of depression of the brake pedal. In addition, driving assistance apparatus 30 controls the on/off operation of retarder 22 or exhaust brake 23 according to the operation of the auxiliary brake lever.

Vehicle speed sensor 45 is attached to, for example, propeller shaft 14, detects the vehicle speed, and outputs the detection results to driving assistance apparatus 30.

Information output section 50 includes, for example, a speaker and a display section (display), such as a so-called instrument panel or a display (not shown in the drawing) of a navigation system. Through information output section 50, driving assistance apparatus 30 displays information on various kinds of instruments, such as a speed meter, a tachometer, a fuel gauge, a water temperature gauge, and a distance meter, and the automatic running control, and outputs an alarm sound, for example.

Although not shown in the drawing, engine ECU 18, power transmission ECU 19, brake ECU 24, and driving assistance apparatus 30 each include a central processing unit (CPU), a storage medium, such as a read only memory (ROM), a working memory, such as a random access memory (RAM), and a communication circuit. In this case, for example, the functions of the components of driving assistance apparatus 30, which will be described later, are implemented when the CPU executes a control program. Note that all or part of engine ECU 18, power transmission ECU 19, brake ECU 24, and driving assistance apparatus 30 may be combined in one piece.

In vehicle 1 with such a configuration, driving assistance apparatus 30 enables not only the normal running according to the driver's operation but also the running under the automatic running control according to the vehicle speed, the following distance, and the like.

<Configuration and Operation of Driving Assistance Apparatus>

The configuration of driving assistance apparatus 30 of this embodiment will now be described.

Figure 3:
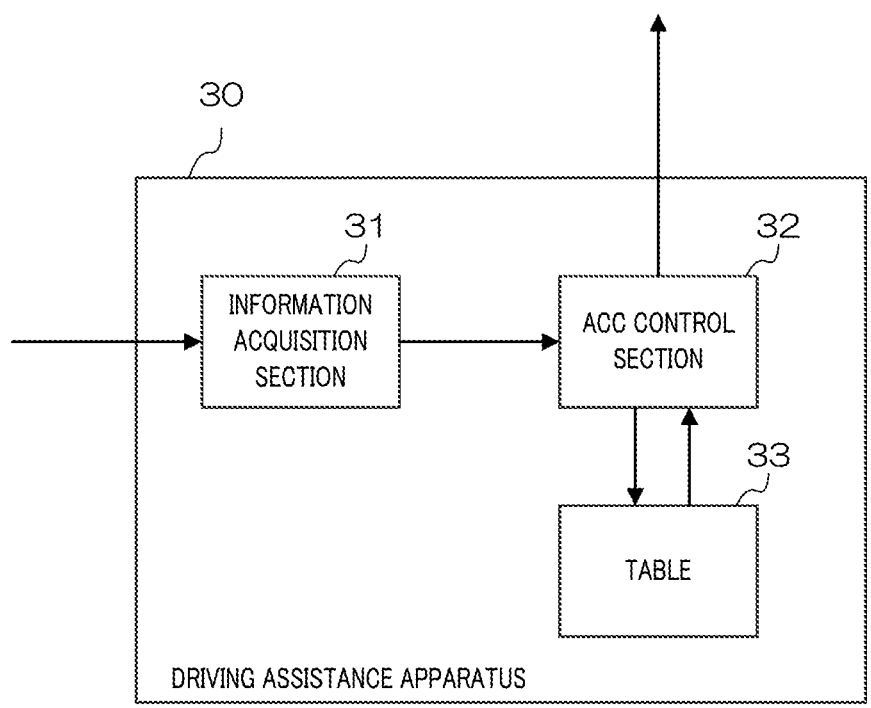
FIG. 3 is a diagram showing an example of the configuration of a driving assistance apparatus according to the embodiment.

FIG. 3 is a diagram showing an example of the configuration of driving assistance apparatus 30.

As shown in FIG. 3, driving assistance apparatus 30 includes information acquisition section 31, ACC control section 32, and table 33.

Receiving information from vehicle speed distance detection section 41, information acquisition section 31 acquires the speed of the preceding vehicle relative to that of the host vehicle and the following distance between the host vehicle and the preceding vehicle. Information acquisition section 31 outputs the acquired relative speed and the following distance to ACC control section 32.

ACC control section 32 reads a degree of urgency from table 33, using the relative speed and the following distance as read addresses.

Table 33 prestores a degree of urgency corresponding to relative speed and following distance. To be specific, table 33 stores a three-dimensional map in which the relative speed and the following distance are associated with the degree of urgency. A degree of urgency is, for example, a value of 0 to 100%, and a higher value indicates a greater degree of urgency. For instance, the higher the relative speed, the greater the degree of urgency, and the smaller the following distance, the greater the degree of urgency.

ACC control section 32 determines the gradient of the target acceleration/deceleration, using the degree of urgency read from table 33. To be specific, ACC control section 32 determines gradient y of the target acceleration/deceleration, using the following equation 1.

$$y = a \times x + b \qquad \text{(Equation 1)}$$

Here, a and b are predetermined fixed values, and x is a degree of urgency.

ACC control section 32 determines the target acceleration/deceleration using gradient y obtained from equation 1, and outputs the target acceleration/deceleration to brake ECU 24 as a control signal for controlling the brake pressure of the main brake. Thus, the brake pressure of the main brake is controlled according to the target acceleration/deceleration having gradient y shown in FIG. 4.

Figure 4:
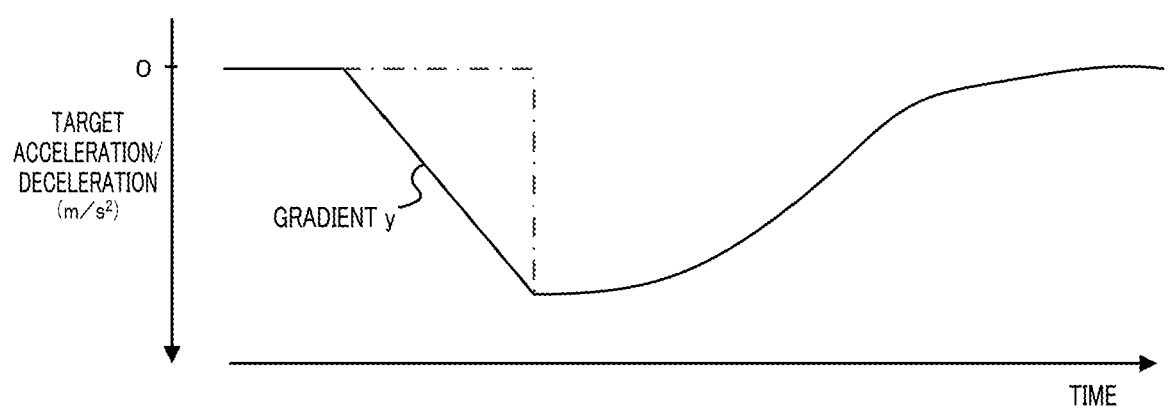
FIG. 4 is a diagram showing an example of target acceleration/deceleration for controlling the brake pressure of a main brake according to the embodiment.
Figure 5:
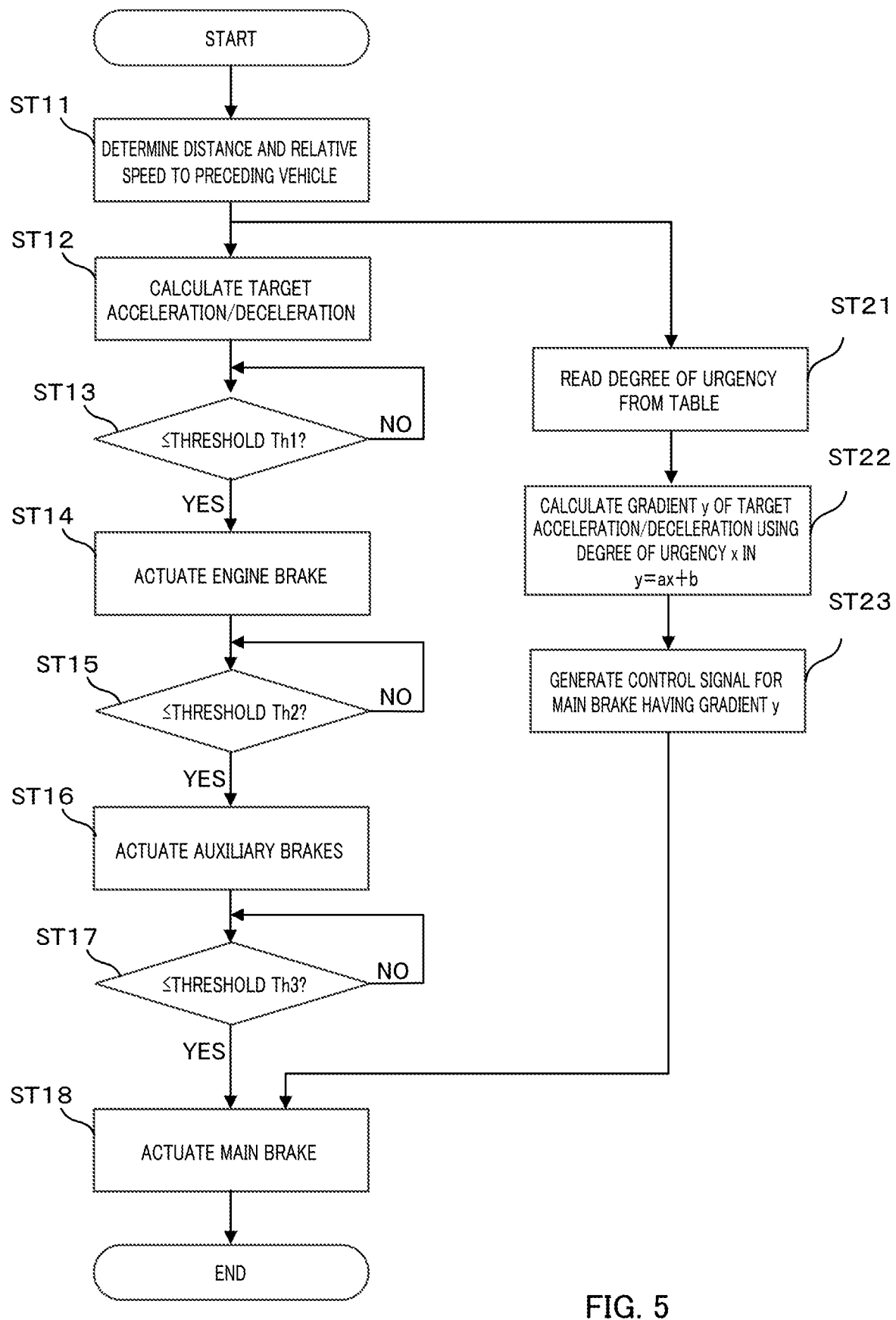
FIG. 5 is a flow chart showing an example of the operation of the driving assistance apparatus according to the embodiment.

Gradient y reflects a degree of urgency x and the brake pressure is controlled so that the brake pressure gradually increases as the degree of urgency decreases, thereby preventing the brake pressure from unnecessarily and rapidly increasing, and thus avoiding unnecessary discomfort to the people in the vehicle. For instance, if the target deceleration indicated by the dot-and-dash line in FIG. 4 is set although the degree of urgency is low, the brake pressure unnecessarily and rapidly increases, which may be a cause of unnecessary discomfort to the people in the vehicle. In this embodiment, this can effectively be avoided.

The operation of driving assistance apparatus 30 of this embodiment will now be described.

In Step ST11, information acquisition section 31 determines the distance and relative speed to the preceding vehicle. In the following Step ST12, ACC control section 32 determines the target acceleration/deceleration according to the distance and relative speed to the preceding vehicle.

When the target acceleration/deceleration is less than or equal to threshold Th1 (Step ST13; YES), ACC control section 32 instructs engine ECU 18 to actuate the engine brake, so that the engine brake is actuated (Step ST14). When the target acceleration/deceleration is less than or equal to threshold Th2 (Th2<Th1) (Step ST15; YES), ACC control section 32 instructs auxiliary brakes 22 and 23 to actuate, so that the auxiliary brakes are actuated (Step ST16). When the target acceleration/deceleration is less than or equal to threshold Th3 (Th3<Th2) (Step ST17; YES), ACC control section 32 instructs brake ECU 24 to actuate the main brake.

On the other hand, ACC control section 32 reads a degree of urgency x from table 33 in Step ST21, and calculates gradient y of the target acceleration/deceleration using a degree of urgency x in y=a×x+b in Step ST22. In Step ST23, ACC control section 32 generates a control signal (target acceleration/deceleration) for the main brake having gradient y shown in FIG. 4, and outputs it to brake ECU 24.

In Step ST18, brake ECU 24 actuates the main brake by controlling the brake pressure according to the control signal (target acceleration/deceleration) for the main brake generated in Step ST23.

Advantageous Effects of this Embodiment

As described above, driving assistance apparatus 30 according to this embodiment includes: information acquisition section 31 that acquires a relative speed of a preceding vehicle, and a following distance to the preceding vehicle; table 33 that prestores a degree of urgency corresponding to the relative speed and the following distance; and ACC control section 32 that reads, from table 33, a degree of urgency x corresponding to the relative speed and the inter-vehicle speed acquired by information acquisition section 31, determines a target acceleration/deceleration having gradient y based on the read degree of urgency x, and outputs the determined target acceleration/deceleration as a control signal (a target acceleration/deceleration) for controlling brake pressure, thereby achieving braking assistance that avoids unnecessary sudden deceleration made through the main brake, while ensuring safety.

Further, since a degree of urgency x is acquired by looking up the table and gradient y of the target acceleration/deceleration is determined using a linear function using that a degree of urgency x, gradient y based on a degree of urgency x can be determined more rapidly with a simple configuration.

Consequently, driving assistance apparatus 30 can be provided that can perform delicate main brake control as needed while ensuring safety with a simple configuration.

The above embodiment merely shows specific examples for implementing the present invention and the technical scope of the present invention should not be construed as being limited because of them. In other words, the present invention can be implemented in various modes without departing from the spirit or main features of the present invention.

For instance, although gradient y of the target acceleration/deceleration is determined using y=a×x+b in the above-described embodiment, this is not the only way of determining gradient y and, in brief, only has to be determined using a function in which a degree of urgency x is a variable. Note that, in the above-described embodiment in which gradient y is determined using a linear function, gradient y can be instantaneously determined with a simple processing circuit.

A part of the configuration of driving assistance apparatus 30 described above may be physically separated from the other parts of the configuration of driving assistance apparatus 30. In this case, their configurations each need to be provided with a communication section to communicate with each other.

This application is based upon Japanese Patent Application No. 2016-082142, filed on Apr. 15, 2016; the entire contents of which are incorporated herein by reference.

INDUSTRIAL APPLICABILITY

The driving assistance apparatus of the present disclosure is widely applicable to driving assistance apparatus that set a target acceleration/deceleration for controlling the brake pressure.

REFERENCE SIGNS LIST

1 Vehicle
2 Trailer
3 Vehicle body
4 Hose
5 Cock
6 Coupler lock switch
7 Loading section
8 Trailer wheel
10 Driving system
11 Engine
12 Clutch
13 Transmission
14 Propeller shaft
15 Differential apparatus
16 Drive shaft
17 Wheel
18 Engine ECU
19 Power transmission ECU
20 Braking system
21 Service brake (main brake)
22 Retarder
23 Exhaust brake
24 Brake ECU
30 Driving assistance apparatus
31 Information acquisition section
32 ACC control section
33 Table
41 Following distance detection section
42 ACC operating section
43 Accelerator operation detection section
44 Brake operation detection section
45 Vehicle speed sensor
50 Information output section

The invention claimed is:

1. A driving assistance apparatus that assists in driving a vehicle, the driving assistance apparatus comprising:
   an information acquisition section that acquires a speed of a preceding vehicle relative to the vehicle, and a following distance between the vehicle and the preceding vehicle;
   a table that prestores a degree of urgency corresponding to the relative speed and the following distance; and
   a control section that outputs a control signal for controlling at least one brake based on information acquired by the information acquisition section and the degree of urgency stored in the table,
   wherein, the control section is configured to:
      determine a target acceleration/deceleration based on the following distance to the preceding vehicle and the speed of the preceding vehicle relative to the vehicle;
      determine a gradient of the target acceleration/deceleration, using the degree of urgency read from the table;
      control the target acceleration/deceleration so as to change according to the determined gradient when the target acceleration/deceleration is equal to or less than a second threshold value;
      actuate at least one of an engine brake or an auxiliary brake when the target acceleration/deceleration is equal to or less than a first threshold;
      actuate a service brake when the target acceleration/deceleration is equal to or less than a second threshold, wherein the second threshold is less than the first threshold; and
      actuate at least one of the engine brake or the auxiliary brake without using the determined gradient when the target acceleration/deceleration is equal to or less than a first threshold and the target acceleration/deceleration is greater than the second threshold.

2. The driving assistance apparatus according to claim 1, wherein
   the control section determines gradient y of the target acceleration/deceleration using the following equation 1:

$$y = a \times x + b \quad \text{(Equation 1)}$$

where a and b are predetermined fixed values, and x is a variable value that shows degree of urgency read from the table.

* * * * *